United States Patent
Quesenberry et al.

(10) Patent No.: US 7,095,960 B2
(45) Date of Patent: Aug. 22, 2006

(54) SPURIOUS FREE DYNAMIC RANGE IN OPTICAL COMMUNICATIONS SYSTEMS

(75) Inventors: Paul E. Quesenberry, Marietta, GA (US); Saleh R. Al-Araji, Alpharetta, GA (US); Edward W. Brumley, Jr., Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 599 days.

(21) Appl. No.: 10/213,658

(22) Filed: Aug. 6, 2002

(65) Prior Publication Data

US 2004/0028414 A1 Feb. 12, 2004

(51) Int. Cl.
*H04B 10/00* (2006.01)

(52) U.S. Cl. .................................... 398/115; 398/85

(58) Field of Classification Search ................ 398/115, 398/85
See application file for complete search history.

(56) References Cited

U.S. PATENT DOCUMENTS

| | | | | |
|---|---|---|---|---|
| 4,217,488 A | * | 8/1980 | Hubbard | 398/40 |
| 5,926,513 A | * | 7/1999 | Suominen et al. | 375/346 |

* cited by examiner

*Primary Examiner*—David C. Payne

(57) ABSTRACT

The present invention is directed towards an optical transmitter including a noise generator. The noise generator provides noise signals that are filtered to below a frequency spectrum. The filtered noise signals are combined with RF signals to provide continuous modulation of a laser. The combined signals are converted to optical signals by the laser and transmitted over an optical link.

9 Claims, 4 Drawing Sheets

SPURIOUS FREE DYNAMIC RANGE IN OPTICAL COMMUNICATIONS SYSTEMS

FIELD OF THE INVENTION

This invention relates generally to broadband communications systems, such as cable television networks, and more specifically to an optical transmitter including a spurious noise mitigator circuit that is suitable for use in the broadband communications system.

BACKGROUND OF THE INVENTION

FIG. 1 is a block diagram illustrating an example of one branch of a conventional broadband communications system, such as a two-way hybrid/fiber coaxial (HFC) network, that carries optical and electrical signals. Such a network may be used in a variety of systems, including, for example, cable television networks, voice delivery networks, and data delivery networks to name but a few. The communications system 100 includes headend equipment 105 for generating forward, or downstream, signals (e.g., voice, audio, video, or data signals) that are transmitted to subscriber equipment 145. Initially, the forward signals are transmitted via optical transmitters (not shown) as optical signals along a first communication medium 110, such as a fiber optic cable. In most networks, the first communication medium 110 is a long haul segment that carries light having a wavelength in the 1550 nanometer (nm) range. The first communication medium 110 carries the forward signal to hubs 1115, which include equipment that transmits the optical signals over a second communication medium 120. In most networks, the second communication medium 120 is an optical fiber that is designed for shorter distances, and which carries light having a wavelength in the 1310 nm range.

From the hub 115, the signals are transmitted to an optical node 125 including an optical receiver and a reverse optical transmitter. The optical receiver converts the optical signals to radio frequency (RF), or electrical, signals. The electrical signals are then transmitted along a third communication medium 130, such as coaxial cable, and are amplified and split, as necessary, by one or more distribution amplifiers 135a–c positioned along the communication medium 130. Taps 140 further split the forward signals in order to provide signals to subscriber equipment 145, such as set-top terminals, computers, telephone handsets, modems, televisions, etc. It will be appreciated that only one branch of the network connecting the headend equipment 105 with the plurality of subscriber equipment 145 is shown for simplicity. However, those skilled in the art will appreciate that most networks include several different branches connecting the headend equipment 105 with several additional hubs 115, optical nodes 125, amplifiers 135a–c, and subscriber equipment 145.

In a two-way network, the subscriber equipment 145 generates reverse RF signals, which may be generated for a variety of purposes, including video signals, e-mail, web surfing, pay-per-view, video-on-demand, telephony, and administrative signals from the set-top terminal. These reverse RF signals are typically in the form of modulated RF carriers that are transmitted upstream through the reverse path to the headend equipment 105. The reverse electrical signals from various subscribers are combined via the taps 140 and passive electrical combiners (not shown) with other reverse signals from other subscriber equipment 145. The combined reverse electrical signals are amplified by one or more of the distribution amplifiers 135a–c and typically converted to optical signals by the reverse optical transmitter included in the optical node 125 before being provided to the headend equipment 105. It will be appreciated that in the electrical, or RF, portion of the network 100, the forward and reverse electrical signals are carried along the same coaxial cable 130. In contrast, the forward and reverse optical signals on the first and second communications media 110, 120 are usually carried on separate optical fibers.

It is well known in the art that spurious noise exists on the optical link connecting the optical transmitter and the optical receiver. More specifically, spurious noise is generated from the interaction of the laser included in the transmitter with the rest of the optical link. Spurious noise comprises very fast noise beats that rise out of the general noise floor and is typically viewed at the optical receiver output with test equipment, such as a spectrum analyzer. The beats are a product of Rayleigh backscatter in the optical fiber creating brief external cavities. Spurious noise beats tend to cluster at low frequencies, but they may also concentrate at higher frequencies. Spurious noise, therefore, affects both data signals and video signals.

The most effective method of preventing spurious noise is to optically isolate the laser, thereby preventing backscattered photons from impacting the laser. Optical attenuation can be used to reduce, but not eliminate, spurious noise, however, at the cost of reduced optical power. A 5 dB optical attenuator at the laser improves spurious performance by about 10 dB. Disadvantageously, however, the cost of an isolator is expensive and sometimes exceeds that of the laser. Another method to reduce the effect of spurious noise is to modulate the laser to increase its linewidth. Accordingly, the peak intensity of the central mode is reduced, thereby reducing the amplitude of the spurious noise beats. This is typically a more cost effective method.

FIG. 2 is a block diagram of a conventional optical transmitter including an oscillator for introducing dithering tones, which is a method of reducing spurious noise by continuously modulating the laser. In this example, three dithering tones are introduced in the optical transmitter 200 and generally appear below the RF frequency range that is designated for signal transmission. For example, dithering tones are introduced at three different frequencies via a 3-tone oscillator 205 typically within the range from 0 MHz to 5 MHz, where the reverse RF frequency range is from 5 MHz to 45 MHz. After filtering via a lowpass filter 210, the three tones are then combined with the main input RF signal. Typically, the composite power of the tones is set to a level that gives the best system performance at low channel loading since the laser is not being modulated as often due to the limited number of services and the infrequent transmission of signals. As a result, in-band intermodulation products are disadvantageously generated as the channel loading increases. Additionally, the composite power of the dithering tones reduces the system dynamic range available to desired signals. As a general rule, the intermodulation products should be at least 40 dB below a digital carrier signal and 57 dB below a video carrier signal.

Dithering tones are not recommended, however, when video carrier signals are present because the dithering tones affect the viewing quality and signal processing of the video signals. Additionally, dithering tones affect a high channel loading system, such as a system transmitting all digital channels. What is needed, therefore, is an effective and efficient method and apparatus of mitigating the effects of spurious noise particularly when video signals and signals in a high channel loading system are transmitted.

DETAILED DESCRIPTION OF A PREFERRED EMBODIMENT

The present invention will be described more fully hereinafter with reference to the accompanying drawings in which like numerals represent like elements throughout the several figures, and in which exemplary embodiments of the invention are shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. For example, the present invention is explained relative to the reverse path of a communications system; however, the present invention can also be used in the forward path. The present invention is described more fully hereinbelow.

Figure 1:
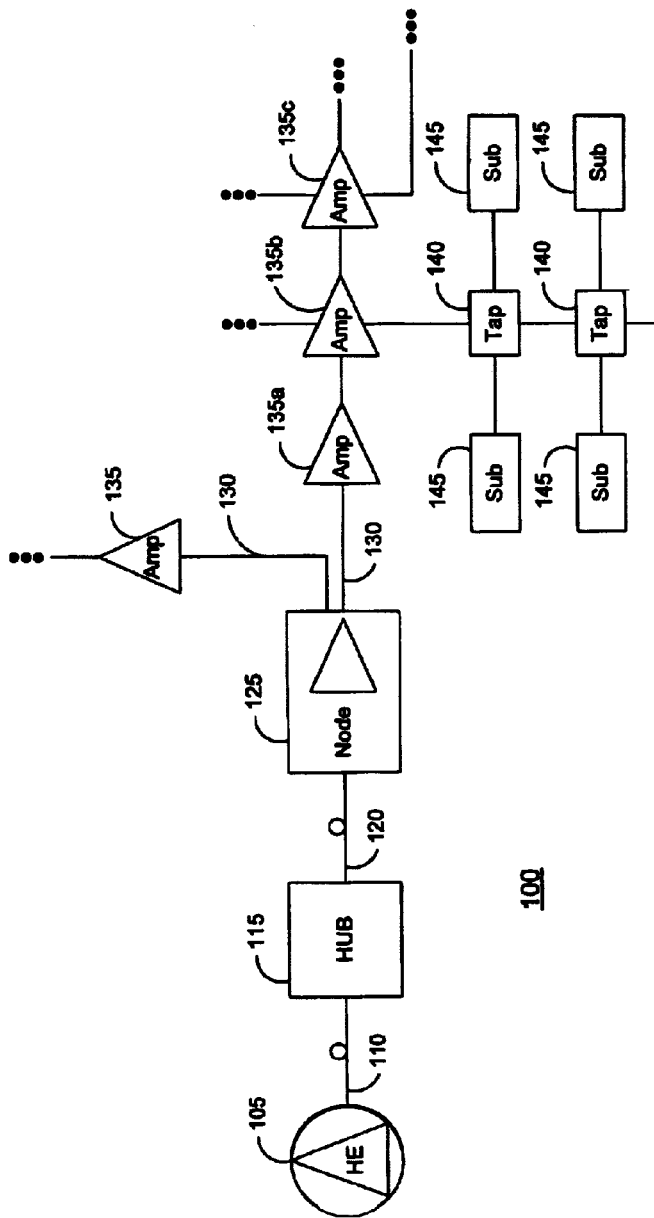
FIG. 1 illustrates an example of one branch of a conventional broadband communications network, such as a two-way HFC cable television network, that carries optical and electrical signals.
Figure 2:
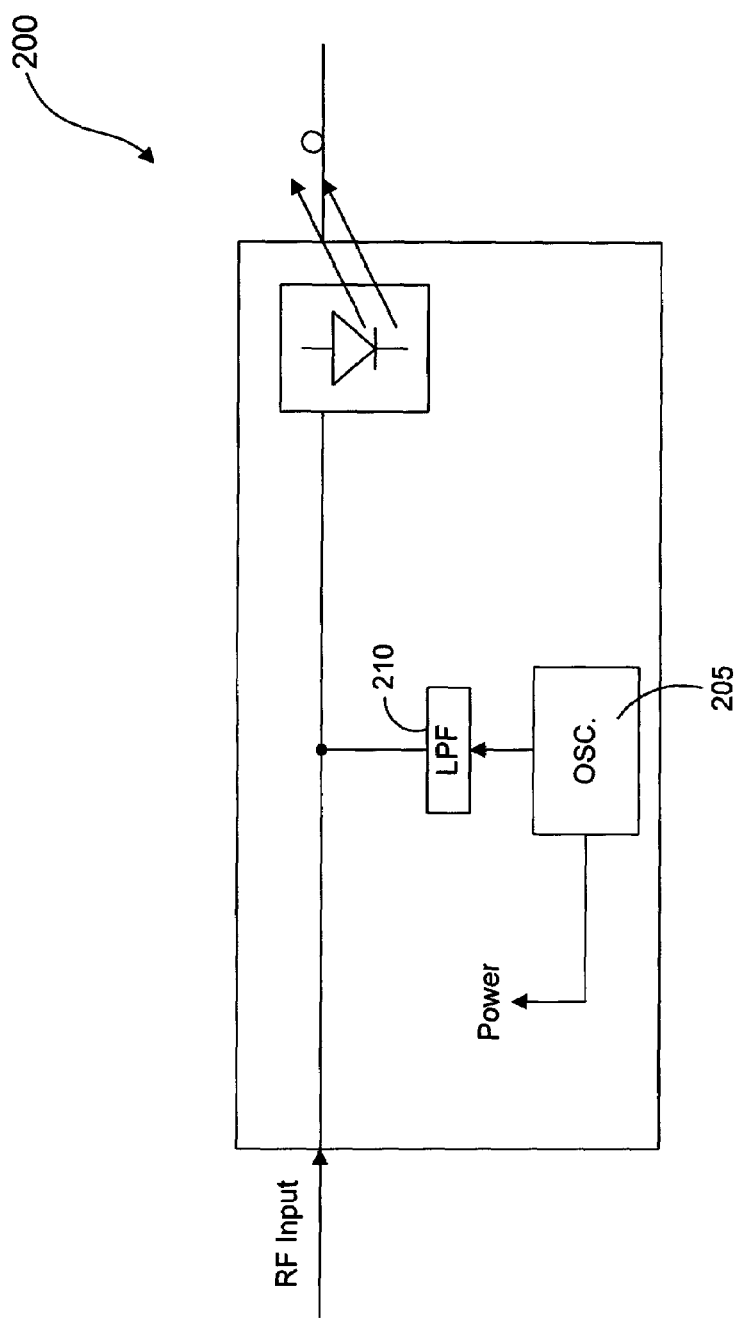
FIG. 2 is a block diagram of a conventional optical transmitter including an oscillator for introducing dithering tones, which is a method of reducing spurious noise by continuously modulating the laser.

The present invention is directed towards replacing the oscillator 205 (FIG. 2) with a noise generator. The noise generator provides filtered noise signals that are combined with the RF signals, wherein the RF signals can be either analog signals or digital signals. The noise signals ensure that the laser is continuously modulated regardless of a low channel loading. Accordingly, the optical transmitter in accordance with the present invention removes the previous disadvantages that are associated with conventional optical transmitters that utilize dithering tones to modulate the laser. More specifically, the present invention continuously modulates the laser, significantly lowers the spurious noise as recognized by the optical receiver, and does not introduce in-band intermodulation beats. In this manner, the system dynamic range is significantly improved.

Figure 3:
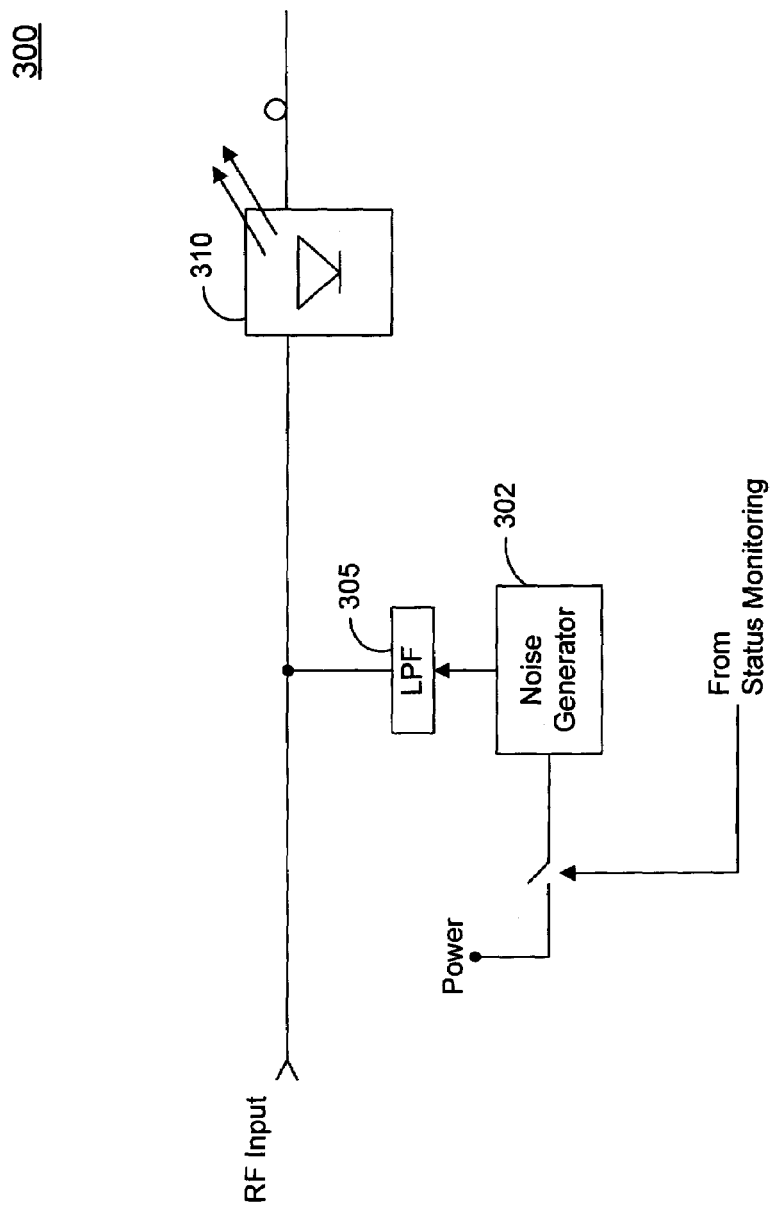
FIG. 3 is a block diagram of an optical transmitter including a noise generator in accordance with the present invention.

FIG. 3 is a block diagram of an optical transmitter 300 including a noise generator 302 in accordance with the present invention. Noise signals continuously generated by the noise generator 302, which can be simply a noise diode, are filtered via a lowpass filter 305. The filtered signals are typically signals filtered below the RF frequency spectrum, such as from 0 MHz to 5 MHz when the RF frequency spectrum is from 5 MHz to 45 MHz.

Figure 4:
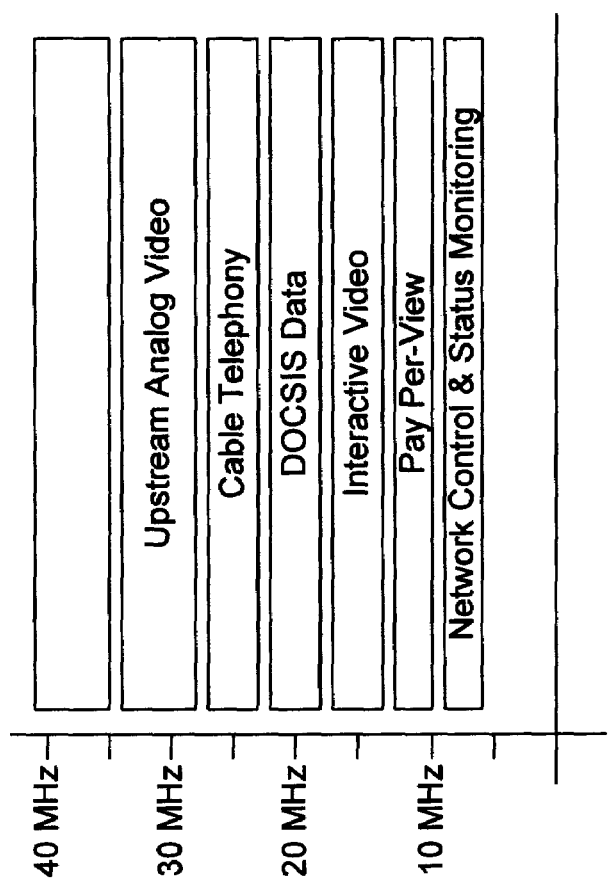
FIG. 4 illustrates a typical reverse frequency spectrum and a channel loading at different frequencies allocated to various services that may be used by the subscriber equipment for the purpose of sending reverse carrier signals.

RF input signals are provided to the optical transmitter 300. FIG. 4 illustrates a typical reverse frequency spectrum and a channel loading at different frequencies allocated to various services that may be used by the subscriber equipment for the purpose of sending reverse carrier signals. In this typical spectrum, the RF input signals that are provided to an optical transmitter are typically carrier signals sent at the predetermined frequency that have been analog modulated. The RF input signals and the noise signals are subsequently combined and provided to a laser 310. The laser 310 converts the combined signals to optical RF signals for transmission to an optical receiver via an optical link.

The noise signals have spectral components that are uncorrelated with the RF input signals and occupy a broader band than the dithering tones. As a result, the in-band intermodulation distortion components are also uncorrelated and occupy broader bands. Additionally, the components have a much lower spectral density, or composite power level, and, therefore, do not cause degraded system performance.

A status monitoring device or a transponder can also be included in the optical transmitter that controls the noise generator among other devices. Status monitoring typically relays the status of a plurality of communications equipment that are included in the system in areas such as power supply functionality, equipment configuration, and output level to name but a few. Status monitoring can also be used, however, as a control function. Status monitoring software can reside at the headend of the communications system and, when necessary, remotely enable or disable a noise generator or several noise generators that are included in the optical transmitters. In this manner, the physical location of the optical transmitter never has to be visited in order to change the status of an included noise generator.

The present invention, therefore, eliminates the conventionally produced spurious noise by replacing the oscillator with a noise generator while increasing the system dynamic range. Additionally, noise generators are much less expensive than oscillators. In this manner, less expensive lasers having a broader range of specifications can be used in optical transmitters while mitigating their negative effects.

What is claimed is:

1. In a communications system for transmitting RF signals, the RF signals including video and data carrier signals, the communications system including optical transmitters for receiving the RF signals and for transmitting optical RF signals to optical receivers via an optical link, the optical transmitter comprising:
    a noise generator for providing noise signals;
    a lowpass filter for providing filtered noise signals in a range from 0 MHZ to 5 MHZ, wherein the filtered noise signals are combined with the received RF signals to provide a combined signal; and
    a laser for converting the combined signal into an optical RF signal,
    wherein with the filtered noise signals provide continuous modulation for the laser,
    whereby providing the filtered noise signals reduce the disadvantageous effects of spurious noise and increases the system dynamic range of the optical transmitter.

2. The communications system of claim 1, wherein the noise generator is a noise diode.

3. The communications system of claim 1, wherein the RF signals are in a range from 5 MHz to 45 MHz.

4. The communications system of claim 1, wherein the optical transmitter further comprising:
    a status monitoring device for controlling the noise generator dependent upon a signal,
    wherein the status monitoring device enables the noise generator in response to an enable signal, and wherein the status monitoring device disables the noise generator in response to a disable signal.

5. The communications system of claim 4, wherein the enable signal and the disable signal are provided by a software system located at a headend facility.

6. The communications system of claim 1, wherein the RF signals are analog signals.

7. The communications system of claim 1, wherein the RF signals are digital signals.

8. In a communications system for transmitting RF signals, the RF signals including video and data carrier signals, the communications system including optical transmitters for receiving the RF signals and for transmitting optical RF signals to optical receivers via an optical link, the optical transmitter comprising:

a noise generator for providing noise signals;

a status monitoring device for controlling the noise generator dependent upon a signal, wherein the status monitoring device enables the noise generator in response to an enable signal, and wherein the status monitoring device disables the noise generator in response to a disable signal;

a lowpass filter for providing filtered noise signals, wherein the filtered noise signals are combined with the received RF signals to provide a combined signal; and a laser for converting the combined signal into an optical RF signal, wherein with the filtered noise signals provide continuous modulation for the laser, whereby providing the filtered noise signals reduce the disadvantageous effects of spurious noise and increases the system dynamic range of the optical transmitter.

9. The communications system of claim 8, wherein the enable signal and the disable signal are provided by a software system located at a headend facility.

* * * * *

UNITED STATES PATENT AND TRADEMARK OFFICE
CERTIFICATE OF CORRECTION

| | | |
|---|---|---|
| PATENT NO. | : 7,095,960 B2 | Page 1 of 1 |
| APPLICATION NO. | : 10/213658 | |
| DATED | : August 27, 2006 | |
| INVENTOR(S) | : Quesenberry et al. | |

It is certified that error appears in the above-identified patent and that said Letters Patent is hereby corrected as shown below:

Column 1, Line 30, delete "1115" and insert therefore -- 115 --

Signed and Sealed this

Third Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,095,960 B2 | Page 1 of 1 |
| APPLICATION NO. | : 10/213658 | |
| DATED | : August 22, 2006 | |
| INVENTOR(S) | : Quesenberry et al. | |

It is certified that error appears in the above-identified patent and that said Letters Patent is hereby corrected as shown below:

Column 1, Line 30, delete "1115" and insert therefore -- 115 --

This certificate supersedes Certificate of Correction issued April 3, 2007.

Signed and Sealed this

Eighth Day of May, 2007

JON W. DUDAS
*Director of the United States Patent and Trademark Office*